United States Patent Office 3,115,666
Patented Dec. 31, 1963

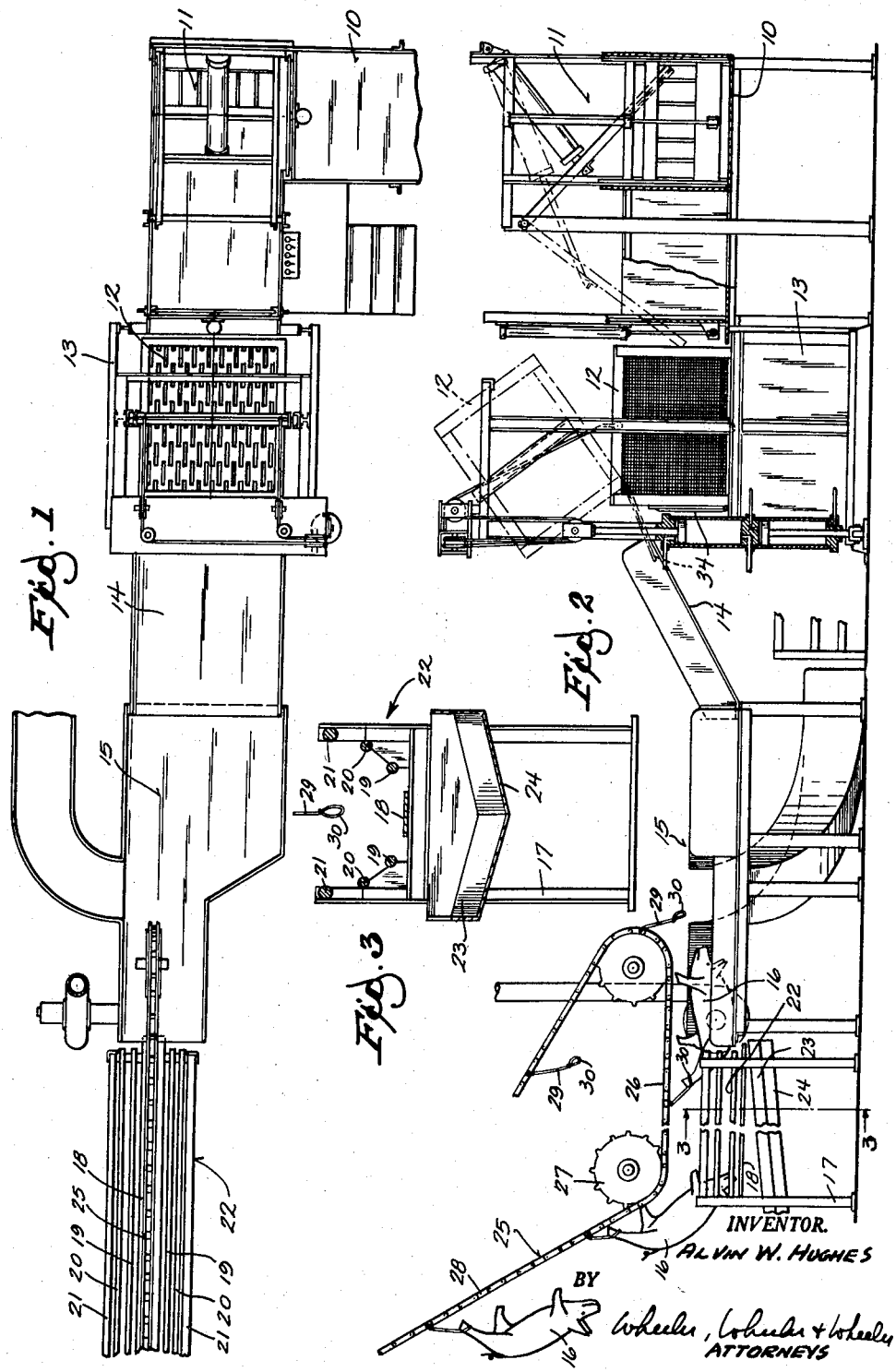

3,115,666
SLAUGHTER HOUSE EQUIPMENT AND APPARATUS FOR BLEEDING SLAUGHTERED ANIMALS
Alvin W. Hughes, 4N194 Church Road, Bensenville, Ill.
Original application Sept. 26, 1955, Ser. No. 536,389, now Patent No. 2,978,737, dated Apr. 11, 1961. Divided and this application Sept. 13, 1961, Ser. No. 137,899
2 Claims. (Cl. 17—1)

The present invention relates to slaughter house equipment and more particularly to apparatus for bleeding an animal after the voluntary processes of the animal have been immobilized by anesthetization, asphyxiation, shock, or stunning impact.

It is extremely important that the animal be bled prior to being lifted by one leg, usually a hind leg, as by the shackle of an overhead conveyor. An animal so lifted while its veins still contain blood may rupture blood vessels in the shackled leg, thus reducing the value of the resulting meat. The present invention provides an animal-lifting shackle connected with an overhead conveyor for attachment to the animal's hoof while he lies inert in an inverted position and supported from beneath after having been immobilized.

Anesthetizing or electrically stunning the animal are preferred means of immobilizing an animal. Immobilization is described in my parent Patent 2,978,737, issued on application Serial No. 536,389. The present application is filed pursuant to requirement of restriction in co-pending application 861,079, filed December 21, 1959.

The shackle previously described draws the inert animal in a generally horizontal direction along a bleeding rack. The animal is stuck and bled while supported by the rack. By the time the conveyor lifts the animal away from the support of the rack the animal no longer has sufficient blood in his veins to do any damage in case a blood vessel ruptures.

Details of the foregoing structure and incidental apparatus will be described specifically with reference to the attached drawings.

FIG. 1 is a plan view of slaughter house structure including immobilizing means, a bleeding rack, and a shackle conveyor.

FIG. 2 is a side elevational view of the structure of FIG. 1.

FIG. 3 is a view taken along line 3—3 of FIG. 2.

There is shown in the drawings, and particularly with reference to FIG. 1, a loading ramp 10 leading into an animal metering chamber 11. The purpose of such structure is to control the number of animals which can be passed through the metering chamber 11 and into elevator structure 12 for the purpose of being lowered into gas chamber 13, wherein they are anesthetized for immobilization.

After the animals are anesthetized to the proper degree they collapse upon the floor of the elevator. Thereupon the elevator is raised to the dotted line position shown in FIG. 2, wherein the elevator 12 is tipped and the animals are discharged from the elevator 12 over flap 34 down chute 14. Chute 14 delivers the immobilized animal by gravity to the shackling station 15.

Extending outwardly from the shackling station 15 is a bleeding rack 22. This rack is an elongated device which comprises a frame 17. While details are unimportant, there is desirably a supporting strip 18 on which the weight of the immobilized animal 16 is carried during its progression longitudinally of the rack. At suitable spacing along the sides are tubular bars 19, 20 and 21 between which the body of the animal 16 is confined. Beneath the rack 22 there is desirably a blood-collecting trough 23 which is preferably inclined or has a pitched bottom 24.

Extending longitudinally along the rack overhead is the generally horizontal run 26 of a shackle conveyor 25. Only a portion is illustrated. After passing about a sprocket 27 remote from the shackling station 15, the conveyor 25 has a run extending upwardly as shown at 28 in FIG. 2.

Depending at intervals from the conveyor are thongs 29 with shackles 30 at their ends. An attendant will engage a shackle 30 with a hoof of an immobilized animal 16 as the latter lies at the shackling station 15. Movement of the conveyor 25 will cause the shackle 30 to pull the animal 16 along the rack 22. Immediately, the animal will be stuck by opening a blood vessel in its throat.

As the animal slides along the rack 22, its blood will flow into the trough 23 and be delivered to a suitable point of collection. Meantime, when the conveyor run 28 lifts the shackle 30 and the animal 16 to which it is attached, the animal 16 will no longer have the strength to resist, nor will its veins contain blood congestion, and therefore the meat will not be damaged should a blood vessel in the shackled leg rupture.

An important feature of this invention is to carry the weight of the animal along the rack until the bleeding has progressed sufficiently far so that no damage will result when the animal is lifted. The animal in prone position is supported from below with or without movement along the rack until the bleeding has rendered it incapable of effective resistance and the animal is then lifted and suspended from above, head down, for the completion of bleeding.

I claim:

1. The combination with a bleeding rack comprising elongated supporting bars laterally spaced sufficiently to facilitate the draining of blood from an animal supported thereon, of an overhead conveyor having depending shackles, said conveyor having means establishing a conveyor path along the said rack for advancing an animal engaged by one of said shackles without withdrawing the support of the animal from the rack during the initial bleeding of the animal, said conveyor having another portion establishing a conveyor path diverging from rack for lifting and suspending an animal connected with one of said shackles.

2. The combination with a bleeding rack, of an overhead conveyor having depending shackles, said conveyor having means establishing a conveyor path along the said rack for advancing an animal engaged by one of said shackles without withdrawing the support of the animal from the rack during the initial bleeding of the animal, said conveyor having another portion establishing a conveyor path diverging from rack for lifting and suspending an animal connected with one of said shackles, the rack comprising elongated supporting and lateral confining means spaced to provide a blood-draining opening and to give access to an animal supported and confined on the rack, said rack being provided with an elongated blood-collecting pan positioned beneath said opening to receive blood draining therethrough.

References Cited in the file of this patent
UNITED STATES PATENTS

| 712,579 | Nicholson et al. | Nov. 4, 1902 |
| 2,737,683 | Regensburger | Mar. 13, 1956 |